United States Patent
Kjoerling et al.

(10) Patent No.: US 10,304,471 B2
(45) Date of Patent: May 28, 2019

(54) ENCODING AND DECODING OF AUDIO SIGNALS

(71) Applicant: DOLBY INTERNATIONAL AB, Amsterdam Zuidoost (NL)

(72) Inventors: Kristofer Kjoerling, Solna (SE); Alexander Groeschel, Nuremberg (DE); Heiko Purnhagen, Sundbyberg (SE); Holger Hoerich, Fürth (DE); Kurt Krauss, Nuremberg (DE)

(73) Assignee: Dolby International AB, Amsterdam Zuidoost (NL)

( * ) Notice: Subject to any disclaimer, the term of this patent is extended or adjusted under 35 U.S.C. 154(b) by 74 days.

(21) Appl. No.: 15/519,007

(22) PCT Filed: Oct. 23, 2015

(86) PCT No.: PCT/EP2015/074623
§ 371 (c)(1),
(2) Date: Apr. 13, 2017

(87) PCT Pub. No.: WO2016/062869
PCT Pub. Date: Apr. 28, 2016

(65) Prior Publication Data
US 2017/0243595 A1    Aug. 24, 2017

Related U.S. Application Data

(60) Provisional application No. 62/068,187, filed on Oct. 24, 2014.

(51) Int. Cl.
*G10L 19/16*    (2013.01)
*G10L 19/022*    (2013.01)
(Continued)

(52) U.S. Cl.
CPC .......... *G10L 19/173* (2013.01); *G10L 19/022* (2013.01); *G10L 19/167* (2013.01); *H04N 21/2335* (2013.01); *H04N 21/23418* (2013.01)

(58) Field of Classification Search
None
See application file for complete search history.

(56) References Cited

U.S. PATENT DOCUMENTS 5,936,925 A * 8/1999 Yoshio .................. G11B 19/04
360/39
6,009,236 A * 12/1999 Mishima .............. H04N 9/8042
375/E7.026
(Continued)

FOREIGN PATENT DOCUMENTS

WO    2014/113478    7/2014
WO    2014/161990    10/2014

OTHER PUBLICATIONS

Kim, Jong Kyu, et al. "Frame splitting scheme for error-robust audio streaming over packet-switching networks." IEICE transactions on communications 91.2 (2008): 677-680.*
(Continued)

*Primary Examiner* — Pierre Louis Desir
*Assistant Examiner* — Jonathan C Kim

(57) ABSTRACT

An audio signal (X) is represented by a bitstream (B) segmented into frames. An audio processing system (500) comprises a buffer (510) and a decoding section (520). The buffer joins sets of audio data ($D_1$; $D_2$, . . . , $D_N$) carried by N respective frames ($F_1$, $F_2$, . . . , $F_N$) into one decodable set of audio data (D) corresponding to a first frame rate and to a first number of samples of the audio signal per frame. The frames have a second frame rate corresponding to a second number of samples of the audio signal per frame. The first number of samples is N times the second number of samples. The decoding section decodes the decodable set of
(Continued)

audio data into a segment of the audio signal by at least employing signal synthesis, based on the decodable set of audio data, with a stride corresponding to the first number of samples of the audio signal.

20 Claims, 3 Drawing Sheets

(51) Int. Cl.
*H04N 21/233* (2011.01)
*H04N 21/234* (2011.01)

(56) References Cited

U.S. PATENT DOCUMENTS

| | | | | |
|---|---|---|---|---|
| 6,137,834 | A * | 10/2000 | Wine | H04N 21/2187 375/240 |
| 6,262,776 | B1 * | 7/2001 | Griffits | H04N 5/04 348/512 |
| 6,481,012 | B1 * | 11/2002 | Gordon | H04N 5/4401 348/E5.105 |
| 6,678,332 | B1 * | 1/2004 | Gardere | H04N 21/23424 348/705 |
| 6,754,271 | B1 * | 6/2004 | Gordon | H04N 5/4401 348/385.1 |
| 7,031,348 | B1 * | 4/2006 | Gazit | H04N 21/23406 348/423.1 |
| 7,091,968 | B1 * | 8/2006 | Ludvig | H04N 5/44543 348/E5.105 |
| 7,254,824 | B1 * | 8/2007 | Gordon | H04N 5/4401 348/E5.005 |
| 7,464,394 | B1 * | 12/2008 | Gordon | H04N 21/4344 725/39 |
| 7,471,337 | B2 * | 12/2008 | Wells | H04N 7/56 348/512 |
| 9,094,727 | B1 * | 7/2015 | Gordon | H04N 21/482 |
| 2003/0028879 | A1 * | 2/2003 | Gordon | H04N 5/4401 725/39 |
| 2005/0034155 | A1 * | 2/2005 | Gordon | H04N 5/4401 725/39 |
| 2005/0228651 | A1 * | 10/2005 | Wang | G10L 19/08 704/207 |
| 2006/0093045 | A1 * | 5/2006 | Anderson | H04N 21/23424 375/240.28 |
| 2006/0136229 | A1 * | 6/2006 | Kjoerling | G10L 19/008 704/501 |
| 2007/0071091 | A1 | 3/2007 | Lay | |
| 2007/0156725 | A1 * | 7/2007 | Ehret | G10L 19/167 |
| 2010/0135392 | A1 * | 6/2010 | Kim | H04N 21/23439 375/240.13 |
| 2010/0189182 | A1 * | 7/2010 | Hannuksela | H04N 21/234327 375/240.25 |
| 2011/0293021 | A1 * | 12/2011 | Kotalwar | H04N 21/233 375/240.26 |
| 2013/0141643 | A1 * | 6/2013 | Carson | H04N 21/4307 348/515 |

OTHER PUBLICATIONS

Kim, Jong Kyu, et al. "Frame splitting scheme for error-robust audio streaming over packet-switching networks." IEICE transactions on communications 91.2 (2008): 677-680. (Year: 2008).*

Chow, C. et al "A Novel Approach to Supporting Multipoint-to-Point Video Transmission Over Wireless Ad Hoc Networks" IEICE Trans. Communication, vol. E90-B, No. 8, Aug. 2007, pp. 2046-2055.

ETSI, Digital Audio Commpression (AC-4) Standard, Apr. 2014, pp. 1-295.

Furini, M. et al "A Video Frame Dropping Mechanism Based on Audio Perception" IEEE Communications Society, 2004.

Snell "Dolby E processing Working with Dolby E in a Broadcast Environment" Nov. 2001 URL: http://www.snellgroup.com/documents/white-papers/DolbyE_Processing.pdf.

Hager, L. B et al "RTP Payload Format for AC-3 Audio" MPEG Meeting Mar. 2011, Joint Collaborative Team on Video Coding of ISO/IEC JTC1/SC29, WG11, and ITU-T SG.16.

Kim, J. et al "Frame Splitting Scheme for Error-Robust Audio Streaming Over Packet-Switching Networks" IEICE Transactions on Communications, Society, vol. E91B, No. 2, Feb. 2008, pp. 667-680.

* cited by examiner ates an information loss that cannot be remedied by decoding into a 'perfect' intermediate format. As one example, dynamic range control (DRC) is typically mode-dependent and equipment-dependent, and can therefore be consumed only at the moment of actual playback; a data structure governing the characteristics of DRC throughout an audio packet is difficult to restore faithfully after synchronization has taken place. Hence, the task of preserving metadata of

ENCODING AND DECODING OF AUDIO SIGNALS

CROSS REFERENCE TO RELATED APPLICATIONS

This application claims priority to U.S. Provisional Patent Application No. 62/068,187, filed on Oct. 24, 2014, which is hereby incorporated by reference in its entirety.

TECHNICAL FIELD

The invention disclosed herein generally relates to encoding and decoding of audio signals, and in particular to an audio bitstream format with advantageous scaling behaviour for high frame rates.

BACKGROUND

Audio and video frame rates (or frame frequencies) used in most commercial applications available today follow separate established industry standards manifesting themselves both in recording and playback software products, hardware components as well as agreed formats for transmitting audio and video between communicating parties. Audio frame rates are typically specific to different coding algorithms and associated with specific audio sampling frequencies, such as 44.1 and 48 kHz, which are as notorious as the video frame rates 29.97 fps (NTSC) and 25 fps (PAL) in their respective geographical areas; further standard video frame rates include 23.98, 24 and 30 fps, or in a more generalized form 24, 25, 30 fps and (24, 25, 30)×1000/1001 fps. Attempts to unite or harmonize audio frame rates have not yet been successful despite the shift from analogue to digital distribution, which implies that an audio frame (e.g., a packet or a coding unit suitable for transmission over a network) in general does not correspond to an integer number of video frames in an audiovisual data stream.

The need to synchronize audiovisual data streams arises repeatedly, as a result of clock drift or when several streams are received from different sources for common processing, editing or splicing in a server, a situation frequently encountered in broadcast stations. An attempt to improve video-to-video synchronicity between two audiovisual data streams by duplicating or dropping video frames in one of the streams (e.g. to prepare the streams for splicing) typically leads to an audio-to-video lag within that audiovisual data stream in case the sizes of the audio frames and the video frames do not match. In general, a lag persists—at least of some non-zero duration—even if audio frames corresponding to the video editing are deleted or duplicated.

At the cost of more processing, a larger room for maneuver could be created by temporarily decoding the audio during synchronization into a low-level format that is independent of the division into frames, e.g., baseband format, or pulse-code modulation (PCM) resolved at the original sampling frequency. Such decoding however blurs the exact anchoring of metadata to specific audio segments and creates an information loss that cannot be remedied by decoding into a 'perfect' intermediate format. As one example, dynamic range control (DRC) is typically mode-dependent and equipment-dependent, and can therefore be consumed only at the moment of actual playback; a data structure governing the characteristics of DRC throughout an audio packet is difficult to restore faithfully after synchronization has taken place. Hence, the task of preserving metadata of this type past consecutive decoding, synchronization and encoding stages is no simple task if subjected to complexity constraints.

Even more serious difficulties may arise in connection with legacy infrastructure that is designed to carry two-channel PCM signals and is therefore capable of handling multi-channel content only in coded form.

It is certainly more convenient to encode audio and video data frame-synchronously in the sense that data in a given frame exactly correspond to the same time segment in the recorded and coded audiovisual signal. This preserves audio-to-video synchronicity under frame-wise manipulation of an audiovisual stream, i.e., duplication or rejection of one or more entire independent coding units in the stream. The frame lengths available in the Dolby E™ audio format match video frame lengths. With a typical bit rate of 448 kbps, however, this format was designed primarily for the purpose of professional production, with hard media like digital videocassettes as its preferred storage modality.

In the applicant's co-pending, not yet published application PCT/EP2014/056848, systems and methods are proposed which are compatible with an audio format suitable for distribution purposes as part of a frame-synchronous audiovisual format.

There is a need for an alternative audio format suitable for distribution purposes as part of a frame-synchronous audiovisual format, with improved scaling behaviour for high frame rates. There is also a need for coding and decoding equipment suitable for use therewith.

BRIEF DESCRIPTION OF THE DRAWINGS

In what follows, example embodiments will be described in greater detail and with reference to the accompanying drawings, on which.

Figure 1:
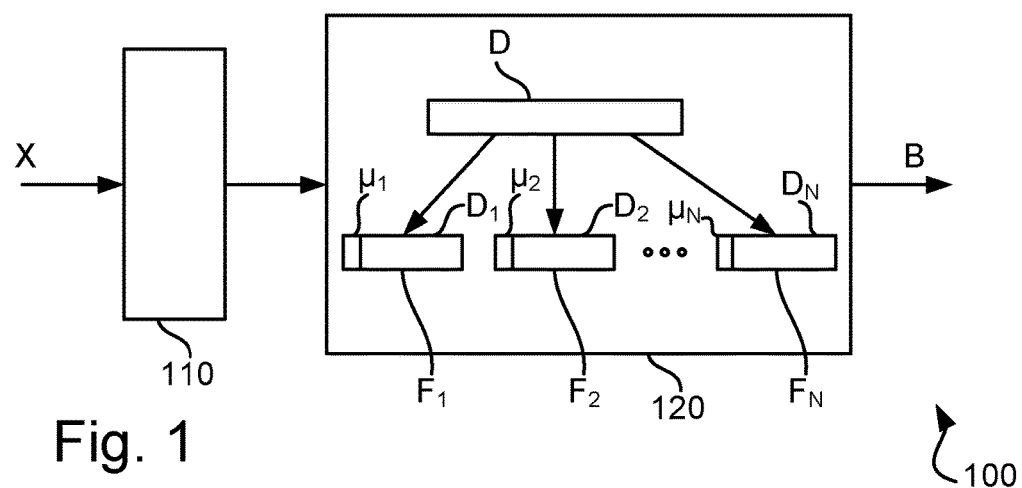
FIG. 1 is a generalized block diagram of an audio processing system for representing an audio signal as an audio bitstream, according to an example embodiment.

All the figures are schematic and generally only show parts which are necessary in order to elucidate the invention, whereas other parts may be omitted or merely suggested.

DESCRIPTION OF EXAMPLE EMBODIMENTS

As used herein, an audio signal may be a standalone audio signal, an audio part of an audiovisual signal or multimedia signal or any of these in combination with metadata.

I. Overview—Encoder Side

According to a first aspect, example embodiments propose audio processing systems, methods and computer program products for representing an audio signal as an audio bitstream. The proposed systems, methods and computer program products, according to the first aspect, may generally share the same features and advantages.

According to example embodiments, there is provided a method of representing an audio signal as an audio bitstream. The method comprises: encoding a segment of the audio signal as one decodable set of audio data by at least performing signal analysis, on the segment of the audio signal, with a stride, referred to herein as a basic stride, corresponding to a first number of samples of the audio signal. The decodable set of audio data corresponds to a first frame rate and to a first number of samples of the audio signal per frame. The method comprises: breaking the decodable set of audio data into N portions, where N≥2; and forming N bitstream frames carrying the respective portions. The bitstream frames have a second frame rate corresponding to a second number of samples of the audio signal per bitstream frame. The first number of samples is N times the second number of samples. The method comprises: outputting a bitstream segmented into bitstream frames including the formed N bitstream frames.

In an audiovisual data stream, audio frames and video frames may be synchronized and may be of equal duration, e.g. to facilitate frame drop or frame duplication in connection with splicing or compensation of clock drift. In order to maintain audio-video synchronicity in an audiovisual data stream for higher video frame rates, the audio frame rate may also be increased. However, while predictive coding is typically employed to reduce the bit rate cost of increasing the video frame rate, predictive coding may be less efficient for audio frames as audio content may be variable on a shorter time scale, and may be associated with a lower degree of correlation between consecutive frames than the video content. For the purposes of this disclosure, unless otherwise stated, a video frame corresponds to one complete screen image (e.g. a still image in a sequence), whereas an audio frame may in principle carry audio data corresponding to a audio signal segment having any duration.

The ability of the present method, to provide N bitstream frames of the second (higher) frame rate, together carrying a decodable set of audio data associated with the first (lower) frame rate, allows for maintaining audio-visual synchronicity for higher video frame rates, but without a corresponding increase in bitrate consumption. More precisely, operating at increased frame rate according to the present method typically results in a bitrate that is lower than required when using regular audio frames having such higher frame rates. The present method may therefore e.g. facilitate splicing of audio-visual data streams and/or facilitate compensation of clock drift.

Indeed, the decodable set of audio data may correspond to the amount of data carried by a regular audio frame of the first (lower) frame rate, and even if the N bitstream frames may need to contain additional non-payload data necessary to comply with a frame format (see below), the total amount of data transmitted from an encoder side to a decoder side may be reduced as compared to employing regular audio frames having the second (higher) frame rate. In particular, performing the signal analysis with the basic stride, instead of with a shorter stride (e.g. corresponding to the second number of samples of the audio signal), reduces the amount of data required to synthesize the audio signal again on a decoder side, and thereby reduces the bitrate required for transmitting the data to a decoder side.

Splicing of the audio bitstream with other bitstreams may for example be performed without regard to the audio data carried by the bitstream frames. In other words, the device or unit performing the splicing need not be aware of the fact that all the N bitstream frames may be required for reconstructing the segment of the audio signal, and may for example treat the bitstream frames as if they were independently decodable. Potentially missing bitstream frames in a spliced bitstream may for example be dealt with on the decoder side by concealing such bitstream frames that may not allow successful decoding.

By a decodable set of audio data is meant a set of audio data which is sufficient for decoding a segment of the audio signal. The decodable set of audio data may be complete in the sense that decoding of a segment of the audio signal may be performed without additional data related to the segment of the audio signal (while non-payload data such as overhead bits, headers or pre-ambles may for example be employed to identify the decodable set of audio data on a decoder side).

By performing signal analysis with a basic stride corresponding to the first number of samples of the audio signal is meant that signal analysis is performed within an analysis window of a certain number of samples of the audio signal, and that, when the next segment of the audio signal is to be encoded, the analysis window is shifted by the same number of samples as the basic stride. The signal analysis may for example be performed with overlapping analysis windows, in which case the analysis window may be longer than the basic stride. In another example, the length of the analysis window may coincide with the basic stride.

It will be appreciated that if the audio signal is a multi-channel signal, then the basic stride may correspond to the first number of samples of the audio signal on a per channel-basis, rather than as a sum of samples for the respective channels.

The step of encoding a segment of the audio signal may for example include multiple sub-steps, one or more of which may include signal analysis with the basic stride.

The decodable set of audio data may represent segment of the audio signal corresponding to the first number of samples of the audio signal. The decodable set of audio data may correspond to a frame having the first frame rate.

Breaking the decodable set of audio data may for example include splitting the decodable set of data into N at least approximately equally sized portions, e.g. comprising at least approximately the same number of bits.

Each of the N portion may be an incomplete set of audio data in the sense that one portion may be insufficient for decoding a segment (or a sub-segment) of the audio signal, without access the other portions.

For each of the N bitstream frames, the N bitstream frames may for example be the smallest collection of bitstream frames which includes that bitstream frame and from which audio data may be joined to decode a segment of the audio signal represented by the data carried by that bitstream frame. In other words, the N bitstream frames may be those carrying data originally contained in the same decodable set of audio data.

The bitstream frames correspond to the second (higher) frame rate in the sense that the N bitstream frames together represent the same segment of the audio signal as the decodable set of audio data which corresponds to the first (lower) frame rate.

Similarly, the bitstream frames correspond to the second (smaller) number of samples per bitstream frame in the sense that the N bitstream frames together represent the first (higher) number of samples also represented by the decodable set of audio data.

It will be appreciated that the bitstream frames may for example carry respective portions of a spectral representation of the segment of the audio signal, and that there may be no connection between one of the bitstream frames and a second (smaller) number of samples of the audio signal.

The N bitstream frames may for example be conformal to an audio format in the sense that the bitstream frames may carry payloads and metadata which, on an elementary stream level, is conformal to an audio format, e.g. as provided in Moving Picture Experts Group (MPEG) elementary streams. It will be appreciated that, although conformal to an audio format in this sense, the payload and at least some of the metadata carried by the bitstream frames may for example be of a different type and/or format than in audio frames known in the art.

The N bitstream frames carrying the N portions may for example be output as N consecutive bitstream frames in the bitstream.

In an example embodiment, performing the signal analysis may include performing, with the basic stride: spectral analysis; energy analysis; and/or entropy analysis. Spectral analysis with the basic stride may for example be performed for transforming the segment of the audio signal from a time domain to a frequency domain. Energy analysis with the basic stride may for example be performed for encoding the segment of the audio signal with an energy-based coding technique. Entropy analysis with the basic stride may for example be performed for encoding the audio signal with an entropy-based coding technique.

In an example embodiment, encoding a segment of the audio signal may include: applying a windowed transform having the basic stride as transform stride; and/or computing a downmix signal and parameters for parametric reconstruction of the audio signal from the downmix signal, wherein the parameters are computed based on the signal analysis.

The windowed transform may for example be a harmonic transform, such as a Modified Discrete Cosine Transform (MDCT), e.g. employing overlapping transform windows.

The audio signal may for example be a multichannel audio signal and the downmix signal may be a signal with fewer channels than the multichannel signal, e.g. obtained as a linear combination of the channels of the multichannel signal. The downmix signal may for example be a mono or stereo downmix of the multichannel audio signal.

In an example embodiment, the method may comprise: including metadata in at least one of the N bitstream frames carrying the portions. The metadata may indicate that the complete decodable set of audio data is obtainable from the portions carried by the N bitstream frames.

Each of the N bitstream frames may for example carry metadata identifying them as belonging to a group of N bitstream frames from which the decodable set of audio data is obtainable. In another example, one of the bitstream frames may carry metadata identifying all of the N bitstream frames, while the other N−1 bitstream frames of the group do not necessarily carry such metadata. The bitstream may for example include other bitstream frames which do not carry such metadata.

The metadata may allow for the N bitstream frames to be located at non-predetermined positions relative to each other. The metadata may allow for other bitstream frames between the N bitstream frames. The metadata may allow for detecting when one or more of the N bitstream frames are missing in the bitstream, e.g. due to splicing or a frame drop.

In an example embodiment, the audio bitstream may be associated with a stream of video frames. The method may further comprise: in response to the stream of video frames comprising a video frame of a certain type, encoding a segment of the audio signal temporally related to the video frame as a second decodable set of audio data by at least performing signal analysis, on the segment of the audio signal temporally related to the video frame, with a shortened stride corresponding to the second number of samples of the audio signal. The second decodable set of audio data may correspond to the second frame rate and to the second number of samples of the audio signal per frame. The method may comprise: including a bitstream frame carrying the second decodable set of audio data in the bitstream.

Streams of video frames may for example be spliced at points adjacent to frames of a certain type, such as independently coded video frames, for facilitating decoding of the spliced sequence of video frames on a decoder side. The approach of encoding a segment of the audio signal temporally related to the video frame of said certain type as a second decodable set of audio data corresponding to the second frame rate, and of including a bitstream frame carrying the second decodable set of audio data in the bitstream, allows for independent decoding of that segment of the audio signal on a decoder side. The present example embodiment may therefore facilitate decoding of that segment of the audio signal in case preceding or succeeding bitstream frames from the audio bitstream may be missing on a decoder side, e.g. as a result of splicing of an audio-visual stream of data comprising the audio bitstream and the stream of video frames, with one or more other audiovisual data streams.

The segment of the audio signal temporally related to the video frame of the certain type may for example correspond to a point in time at which the video frame of the certain type is intended to be reproduced on a display.

The stream of video frames may for example include independently coded frames and predicted coded frames (having either a unidirectional or bidirectional dependence on adjacent frames), and the certain type of video frame may for example be an independently coded video frame.

The method may for example comprise: detecting presence of the certain type of video frame in the stream of video frames. Presence of the certain type of video frame may for example be detected via signalling from a video encoder.

Performing signal analysis with the shortened stride may for example include performing, with the shortened stride: spectral analysis; energy analysis; and/or entropy analysis.

Encoding a segment of the audio signal temporally related to the video frame of the certain type may for example include: applying a windowed transform having the shortened stride as transform stride; and/or computing a downmix signal and parameters for parametric reconstruction of the audio signal from the downmix signal, wherein the parameters are computed based on the signal analysis with the shortened stride.

In an example embodiment, the method may comprise: in response to the stream of video frames comprising a video frame of the certain type, encoding N consecutive segments of the audio signal as respective decodable sets of audio data by, for each of the N consecutive segments, at least applying signal analysis with the shortened stride. The segment temporally related to the video frame may be one of the N consecutive segments. The method may include: including bitstream frames carrying the respective decodable sets of audio data associated with the N consecutive segments in the bitstream.

The bitstream may for example comprise groups of N consecutive bitstream frames carrying respective portions of audio data which are decodable together. Therefore, on a decoder side, N bitstream frames of the bitstream may be decoded at a time. In the present example embodiment, the structure of groups of N bitstream frames may be preserved also when said certain type of video frame occurs in the associated stream of video frames, e.g. regardless of the position in the stream of video frames of the video frame of said certain type relative to the positions of the groups of N consecutive bitstream frames in the bitstream.

According to example embodiments, there is provided an audio processing system for representing an audio signal by an audio bitstream. The audio processing system comprises: an encoding section configured to encode a segment of the audio signal as one decodable set of audio data by at least performing signal analysis, on the segment of the audio signal, with a basic stride corresponding to a first number of samples of the audio signal. The decodable set of audio data corresponds to a first frame rate and to a first number of samples of the audio signal per frame. The audio processing system comprises a reframing section configured to: break the decodable set of audio data into N portions, where N≥2; and form N bitstream frames carrying the respective portions. The bitstream frames have a second frame rate corresponding to a second number of samples of the audio signal per bitstream frame. The first number of samples is N times the second number of samples. The reframing section is configured to output a bitstream segmented into bitstream frames including the formed N bitstream frames.

According to example embodiments, there is provided computer program products comprising a computer-readable medium for performing any of the methods of the first aspect.

According to example embodiments, it may hold that N=2 or N=4, i.e. the N bitstream frames may be two of four bitstream frames.

II. Overview—Decoder Side

According to a second aspect, example embodiments propose audio processing systems as well as methods and computer program products for reconstructing an audio signal represented by a bitstream. The proposed systems, methods and computer program products, according to the second aspect, may generally share the same features and advantages. Moreover, advantages presented above for features of systems, methods and computer program products, according to the first aspect, may generally be valid for the corresponding features of systems, methods and computer program products according to the second aspect.

According to example embodiments, there is provided a method of reconstructing an audio signal represented by a bitstream segmented into bitstream frames. The method comprises: joining sets of audio data carried by N respective bitstream frames into one decodable set of audio data corresponding to a first frame rate and to a first number of samples of the audio signal per frame, where N≥2. The bitstream frames have a second frame rate corresponding to a second number of samples of the audio signal per bitstream frame. The first number of samples is N times the second number of samples. The method comprises: decoding the decodable set of audio data into a segment of the audio signal by at least employing signal synthesis, based on the decodable set of data, with a stride, referred to herein as a basic stride, corresponding to the first number of samples of the audio signal.

In an audiovisual data stream, audio frames and video frames may be synchronized and may be of equal duration, e.g. to facilitate frame drop or frame duplication in connection with splicing or compensation of clock drift. In order to maintain audio-video synchronicity in an audiovisual data stream for higher video frame rates, the audio frame rate may also be increased. However, while predictive coding is typically employed to reduce the bit rate cost of increasing the video frame rate, predictive coding may be less efficient for audio frames as audio content may be variable on a shorter time scale, and may be associated with a lower degree of correlation between consecutive frames than the video content. Too short an audio frame length should also be avoided since it may limit the transform stride, which in turn set a limit on the frequency resolution.

The ability of the present method, to join sets of audio data carried by N respective bitstream frames of the second (higher) frame rate into one decodable set of audio data associated with the first (lower) frame rate, allows for maintaining audio-visual synchronicity for higher video frame rates, but without a corresponding increase in bitrate consumption. More precisely, the bitrate when operating at increased frame rate according to the present method may be lower than required when using regular audio frames having such higher frame rates. The present method may for example facilitate splicing of audio-visual data streams and/or facilitate compensation of clock drift.

In particular, employing the signal synthesis with the basic stride, instead of a synthesis with a shorter stride (e.g. corresponding to the second number of samples of the audio signal), reduces the amount of data required to synthesize the audio signal, and thereby reduces the required bitrate for transmitting the data.

Each of the sets of data joined into the decodable set of audio data may be an incomplete set of audio data in the sense that one of the sets may be insufficient for decoding a segment (or a sub-segment) of the audio signal, without access the other sets.

For each of the N bitstream frames, the N bitstream frames may for example be the smallest collection of bitstream frames which includes that bitstream frame and from which audio data may be joined to decode a segment of the audio signal represented by the data carried by that bitstream frame.

By a decodable set of audio data is meant a set of audio data which is sufficient for decoding a segment of the audio signal. The decodable set of audio data may be complete in the sense that decoding of a segment of the audio signal may be performed without additional audio data.

Joining the sets of audio data into the decodable set of audio data may for example include concatenating the sets of data, e.g. by arranging bits representing the respective sets of data after each other.

By employing signal synthesis with a basic stride corresponding to the first number of samples of the audio signal is meant that signal synthesis is performed for a segment of the audio signal corresponding to a certain number of samples of the audio signal, and that, when the next segment of the audio signal is to be reconstructed, the signal synthesis process produces output for a range that has been shifted by the same number of samples as the basic stride.

The signal synthesis with the basic stride may for example be employed directly based on the decodable set of audio data, or may be employed indirectly based on the decodable set of audio data, e.g. based on audio data or signals obtained by processing the decodable set of audio data.

It will be appreciated that if the audio signal is a multi-channel signal, then the basic stride may correspond to the first number of samples of the audio signal on a per channel-basis, rather than as a sum of samples for the respective channels.

The step of decoding the decodable set of audio data may for example include multiple sub-steps, one or more of which may include signal synthesis with the basic stride.

The N bitstream frames may for example be conformal to an audio format in the sense that the bitstream frames may carry payloads and metadata which, at an elementary stream level, is conformal to an audio format, e.g. as provided in Moving Picture Experts Group (MPEG) elementary streams. It will be appreciated that, although conformal to an audio format in this sense, the payload and at least some of the metadata carried by the bitstream frames may for example be of a different type and/or format than in audio frames known in the art.

A bitstream provided by an encoder may for example have been spliced with another bitstream before reaching the decoder side. E.g., one or more of the N bitstream frames may for example be missing in the bitstream received at the decoder side. In some example embodiments, the audio processing method may therefore include detecting whether one or more of the N bitstream frames from which to join the sets of audio data into the complete decodable set are missing in the bitstream. The method may for example comprise: in response to detecting that one or more of the N bitstream frames are missing in the bitstream, applying error concealment. The error concealment may for example include replacing audio data carried by one or more of the received bitstream frames by zeros, and optionally, applying fade-out and/or fade-in.

In an example embodiment, decoding the decodable set of audio data may include: applying a windowed transform having the basic stride as transform stride; and/or performing parametric reconstruction, with the basic stride, of the segment of the audio signal, based on a downmix signal and associated parameters obtained from the decodable set of audio data.

The windowed transform may for example be a harmonic transform, such as an inverse Modified Discrete Cosine Transform (MDCT).

The audio signal may for example be a multichannel audio signal and the downmix signal may be a signal with fewer channels than the multichannel signal, e.g. obtained as a linear combination of the channels of the multichannel signal. The downmix signal may for example be a mono or stereo downmix of the multichannel audio signal. The decodable set of audio data may for example comprise the downmix signal and the associated parameters for parametric reconstruction of the segment of the audio signal. Alternatively, the decodable set of audio data may comprise data representing the downmix signal and the associated parameters, e.g. in quantized form, from which the downmix signal and the associated parameters may be derived.

In an example embodiment, the N bitstream frames, from which the sets of audio data are joined into the decodable set of audio data, may be N consecutive bitstream frames. Employing consecutive frames for carrying the sets of audio data joinable into a decodable set of audio data may facilitate decoding of the audio signal and may reduce the need for metadata to identify the bitstream frames for which data is to be joined into a decodable set of audio data. Employing consecutive frames for carrying the sets of audio data joinable into the decodable set of audio data may reduce the need for buffering data for performing the decoding.

In an example embodiment, the method may further comprise: determining, based on metadata carried by at least some of the bitstream frames in the bitstream, a group of bitstream frames from which to join the incomplete sets of audio data into the decodable set of audio data. Metadata may for example be carried by all bitstream frames, or by one or more bitstream frame per group of N bitstream frames, for identifying the groups of N bitstream frames. Embodiments may also be envisaged in which the bitstream comprises other frames carrying metadata identifying the groups of N frames, while the N bitstream frames themselves may not carry such metadata.

In an example embodiment, the method may further comprise: detecting whether a bitstream frame carries a decodable set of audio data corresponding to the second frame rate; and decoding the decodable set of audio data corresponding to the second frame rate into a segment of the audio signal by at least employing a signal synthesis, based on the decodable set of audio data corresponding to the second frame rate, with a shortened stride corresponding to the second number of samples.

Bitstream frames carrying sets of audio data which are independently decodable may be employed e.g. for facilitating decoding of bitstreams after splicing and/or after frame drops/duplications. The ability of the method in the present example embodiment to decode using the shortened stride may make it compatible with a bitstream format which facilitates synchronization of audio and video frames.

Decoding the decodable set of audio data corresponding to the second frame rate may for example include: applying a windowed transform having the shortened stride as transform stride; and/or performing parametric reconstruction, with the shortened stride, of a segment of the audio signal, based on a downmix signal and associated parameters obtained from the second decodable set of audio data.

The detection of whether a bitstream frame carries a decodable set of audio data corresponding to the second frame rate may for example be based on metadata carried by the bitstream frame, or based on absence of a particular type of metadata in the bitstream frame.

In an example embodiment, decoding a decodable set of audio data corresponding to the second frame rate may include: providing a delay so that decoding of a group of N consecutive bitstream frames at the second frame rate completes at the same time as if the bitstream frames of the group of N bitstream frames had each carried sets of audio data requiring joining into a decodable set of audio data. The present example embodiment facilitates smooth transitions between segments of the audio signal reconstructed using the basic stride and segments of the audio signal reconstructed using the shortened stride, and may improve playback quality as perceived by a listener.

In an example embodiment, the delay may be provided by buffering at least one decodable set of audio data corresponding to the second frame rate or buffering at least one segment of the audio signal. That is to say, the delay may be provided prior to performing signal synthesis, by buffering one or more decodable sets of audio data corresponding to the second frame rate, or after performing signal synthesis, by buffering one or more of the segments of the audio signal reconstructed from the more decodable sets of audio data corresponding to the second frame rate.

In an example embodiment, the bitstream may be associated with a stream of video frames having a frame rate coinciding with the second frame rate. In the present example embodiment, the frame rate of the bitstream frames may coincide with the frame rate of the video frames, which may facilitate splicing and/or synchronization of an audiovisual data stream comprising the bitstream and the stream of video frames with other audio-visual data streams.

In an example embodiment, decoding a segment of the audio signal based on the decodable set of audio data corresponding to the first frame rate may comprise: receiving quantized spectral coefficients corresponding to the decodable set of audio data corresponding to the first frame rate; performing inverse quantization followed by a frequency-to-time transformation, whereby a representation of an intermediate audio signal is obtained; performing at least one processing step in the frequency domain on the intermediate audio signal; and changing a sampling rate of the processed audio signal into a target sampling frequency, whereby a time-domain representation of a reconstructed audio signal is obtained.

The target sampling frequency may be a predefined quantity, which is configurable by a user or system designer independently of the properties (e.g., the frame rate) of the incoming bitstream.

The inverse quantization may be performed with predetermined quantization levels (or reconstruction levels, or reconstruction points). The quantization levels may have been chosen on an encoder side based on psychoacoustic considerations, e.g., in such manner that the quantization noise for a given frequency (or frequency band) does not exceed the masking threshold. Because the masking threshold is frequency-dependent, it is preferred from an economical point of view to have the encoder side select quantization levels that are non-uniform with respect to frequency. As a consequence, quantization and dequantization typically take place with a particular physical sampling frequency in mind, at which the optimal output is produced.

The at least one processing step may for example be associated with spectral band replication (SBR) and/or dynamic range control (DRC).

As the at least one processing step is performed in the frequency domain, the method may include: performing a time-to-frequency transformation, e.g. performed by a Quadrature Mirror Filter (QMF) analysis filterbank, to obtain a frequency representation of the intermediate audio signal; and performing an additional frequency-to-time transformation, e.g. performed by a QMF synthesis filterbank, for transforming the processed audio signal back into the time domain.

In an example embodiment, the method may accept bitstreams associated with at least two different values for the second frame rate but associated with a common value for the second number of samples per frame. The respective values of the second frame rate may differ by at most 5%. The frequency-to-time transformation may be performed in a functional component configured to employ a windowed transform having a common predefined value for the basic stride as transform stride for the at least two different values for the second frame rate.

In an audio-visual stream of data, the audio frame rate may be adapted to (e.g. may coincide with) the video frame rate, e.g. for facilitating audio-video synchronization and/or splicing. The ability of the method in the present example embodiment to accept audio bitstreams with different frame rates may therefore facilitate audio-video synchronization and/or splicing of audio-visual data streams.

In a critically sampled system, the physical sampling frequency corresponds to the ratio of the physical duration of an audio frame to the number of spectral coefficients contained therein. Functional component(s) performing the inverse quantization and the frequency-to-time transformation need not be aware of the physical duration of the coefficients in a decodable set of audio data, only that the coefficients belong to the same decodable set of audio data. Since the values of the second frame rate differs by at most 5%, the resulting internal sampling frequency will change quite little (in physical units), and the resampling factor used in the final sampling rate conversion will be close to one. Hence, the non-constancy of the internal sampling frequency will typically not lead to any perceptible degradation of the reconstructed audio signal. In different words, the slight up- or down-sampling of the intermediate audio signal, which was produced to be optimal at a sampling frequency differing slightly from the target sampling frequency, will not be psycho-acoustically significant. In particular, some amount of mismatch between the intended physical sampling frequency of functional component(s) performing the inverse quantization and/or the frequency-to-time transformation, and the physical sampling frequencies to which any components downstream thereof are tuned, may be tolerable as long as the deviation is limited.

According to example embodiments, there is provided an audio processing system for reconstructing an audio signal represented by a bitstream segmented into bitstream frames. The audio processing system comprises: a buffer configured to join sets of audio data carried by N respective bitstream frames into one decodable set of audio data corresponding to a first frame rate and to a first number of samples of the audio signal per frame, where N≥2. The bitstream frames have a second frame rate corresponding to a second number of samples of the audio signal per bitstream frame. The first number of samples is N times the second number of samples. The system comprises a decoding section configured to decode the decodable set of audio data into a segment of the audio signal by at least employing signal synthesis, based on the decodable set of audio data, with a basic stride corresponding to the first number of samples of the audio signal.

According to example embodiments, there is provided computer program products comprising a computer-readable medium for performing any of the methods of the second aspect.

According to example embodiments, it may hold that N=2 or N=4, i.e. the N bitstream frames may be two of four bitstream frames.

III. Overview—Transcoding

According to a third aspect, example embodiments propose audio processing systems as well as methods and computer program products for transcoding an audio bitstream representing an audio signal. The proposed systems, methods and computer program products, according to the third aspect, may generally share the same features and advantages. Moreover, advantages presented above for features of systems, methods and computer program products, according to the first and/or aspect, may generally be valid for the corresponding features of systems, methods and computer program products according to the third aspect According to example embodiments, there is provided a method of transcoding an audio bitstream representing an audio signal. The bitstream comprises a sequence of decodable sets of audio data corresponding to a first frame rate and to a first number of samples of the audio signal per frame. The method comprises: extracting a decodable set of audio data from the bitstream; breaking the decodable set of audio data into N portions, where N≥2; and forming N bitstream frames carrying the respective portions. The bitstream frames have a second frame rate corresponding to a second number of samples of the audio signal per bitstream frame. The first number of samples is N times the second number of samples. After this, a bitstream segmented into bitstream frames including the formed N bitstream frames is output. Optionally, a step of processing the decodable set of audio data is performed before the step of breaking the set up into N portions. Depending on the nature of the processing, this may require initially decoding the audio data into a transform or waveform representation.

The present method's ability to provide N bitstream frames of the second (higher) frame rate, together carrying a decodable set of audio data associated with the first (lower) frame rate, allows for maintaining audio-visual synchronicity for higher video frame rates, but without a corresponding increase in bitrate consumption. The bitrate when operating at increased frame rate according to the present method may be lower than required when using regular audio frames having such higher frame rates. The present method may therefore e.g. facilitate splicing of audio-visual data streams and/or facilitate compensation of clock drift.

The method may for example include breaking a processed version of the decodable set of audio data into the N portions.

According to example embodiments, there is provided an audio processing system for transcoding an audio bitstream representing an audio signal, wherein the bitstream comprises a sequence of decodable sets of audio data corresponding to a first frame rate and a first number of samples of the audio signal per frame. The audio processing system comprises: a receiving section configured to extract a decodable set of audio data from the bitstream; and an optional processing section configured to process the decodable set of audio data. The audio processing system comprises a reframing section configured to: break the decodable set of audio data into N portions, where N≥2; and form N bitstream frames carrying the respective portions. The bitstream frames have a second frame rate corresponding to a second number of samples of the audio signal per bitstream frame. The first number of samples is N times the second number of samples. The reframing section is configured to output a bitstream segmented into bitstream frames including the formed N bitstream frames.

According to example embodiments, there is provided computer program products comprising a computer-readable medium for performing any of the methods of the third aspect.

According to example embodiments, it may hold that N=2 or N=4, i.e. the N bitstream frames may be two of four bitstream frames.

IV. Overview—Computer-Readable Medium

According to a fourth aspect, example embodiments propose computer-readable media representing an audio signal. The advantages presented above for features of systems, methods and computer program products, according to the first, second and/or third aspect, may generally be valid for the corresponding features of computer-readable media according to the fourth aspect.

According to example embodiments, there is provided a computer-readable medium representing an audio signal and segmented into bitstream frames. In the computer-readable medium, N of the bitstream frames carry respective sets of audio data joinable into one decodable set of audio data corresponding to a first frame rate and to a first number of samples of the audio signal per frame, where N≥2. The decodable set of audio data is decodable into a segment of the audio signal by at least employing signal synthesis, based on the decodable set of audio data, with a basic stride corresponding to the first number of samples of the audio signal. The bitstream frames have a second frame rate corresponding to a second number of samples of the audio signal per bitstream frame. The first number of samples is N times the second number of samples.

The N bitstream frames of the second (higher) frame rate, together carrying a decodable set of audio data associated with the first (lower) frame rate, allows for maintaining audio-visual synchronicity for higher video frame rates, but without a corresponding increase in bitrate consumption, More precisely, the bitrate when operating at increased frame rate according to the present computer-readable medium may be lower than required when using regular audio frames having such higher frame rates. The present computer-readable medium may therefore e.g. facilitate splicing of audio-visual data streams and/or facilitate compensation of clock drift.

The N bitstream frames carrying the respective sets of audio data joinable into one decodable set of audio data may for example be N consecutive bitstream frames.

In an example embodiment, at least one of the N bitstream frames may carry metadata indicating a group of bitstream frames from which to join the sets of audio data into the decodable set of audio data.

In an example embodiment, the computer-readable medium may further comprise a bitstream frame carrying a second set of audio data decodable into a segment of the audio signal by at least employing signal synthesis, based on the second set of audio data, with a shortened stride corresponding to the second number of samples of the audio signal.

Bitstream frames carrying sets of audio data which are independently decodable, according to the present example embodiment, may be employed e.g. for facilitating decoding of bitstreams after splicing and/or after frame drops/duplications.

According to example embodiments, it may hold that N=2 or N=4, i.e. the N bitstream frames may be two of four bitstream frames.

V. Example Embodiments

FIG. 1 is a generalized block diagram of an audio processing system 100 for representing an audio signal X as an audio bitstream B, according to an example embodiment.

The audio processing system 100 comprises an encoding section 110 and a reframing section 120. The encoding section 110 encodes a segment of the audio signal X as one decodable set of audio data D by at least performing signal analysis on the segment of the audio signal X with a basic stride corresponding to a first number of samples of the audio signal X.

By performing signal analysis with a basic stride corresponding to the first number of samples of the audio signal X is meant that signal analysis is performed within an analysis window of a certain number of samples of the audio signal X, and when the next segment of the audio signal X is to be encoded, the analysis window is shifted by the same number of samples as the basic stride. The signal analysis may for example be performed with overlapping analysis windows, in which case the analysis window may be longer than the basic stride. In another example, the length of the analysis window may coincide with the basic stride.

The audio signal X is exemplified herein by a multichannel audio signal. In the present example embodiment, the encoding section 110 applies a windowed transform, e.g. a Modified Discrete Cosine Transform (MDCT), with the basic stride as transform stride, to the segment of the audio signal X in order to provide a frequency-domain representation of that segment of the audio signal X. In the frequency domain, the encoding section 110 then computes a downmix signal (e.g. a mono or stereo downmix) as a linear combination of the respective channels of the audio signal X. The encoding section 110 also determines parameters for parametric reconstruction of the multichannel audio signal X from the downmix signal. In the present example embodiment, the decodable set of audio data D comprises the downmix signal and the parameters for parametric reconstruction.

The parameters may for example be determined based on signal analysis of the frequency-domain representation. This signal analysis may employ the basic stride, i.e. it may employ the same stride as the windowed transform. The signal analysis may for example include computation of energies and/or covariances of the channels of the multichannel audio signal X.

Embodiments may also be envisaged in which the parameters for parametric reconstruction are determined based on signal analysis with a different stride than the windowed transform. Embodiments may for example be envisaged in which the windowed transform employs a shorter transform stride than the basic stride, and in which the parameters for parametric reconstruction are determined based on signal analysis with the basic stride.

The decodable set of audio data D corresponds to a first frame rate, e.g. 30 fps, and to a first number of samples of the audio signal per frame. That is to say, the decodable set of data D represents the first number of samples of the audio signal, and corresponds to a frame conformal to the first frame rate.

The reframing section 120 breaks the decodable set of audio data D into N portions $D_1, D_2, \ldots, D_N$, e.g. by splitting the decodable set of audio data D into N at least approximately equal-sized portions $D_1, D_2, \ldots, D_N$. N may for example be 2 or 4, or may be any integer larger than or equal to 2.

In the present example embodiment, the decodable set of audio data D is a frequency-domain representation of the first number of samples. Hence, when the decodable set of audio data D is broken into the equal-sized portions $D_1, D_2, \ldots, D_N$, these portions $D_1, D_2, \ldots, D_N$ may comprise respective subsets of the frequency-domain representation, which do not necessarily correspond to any particular subsets of the first number of samples of the audio signal. Hence, the portions $D_1, D_2, \ldots, D_N$ are incomplete sets of audio data in the sense that none of the portion $D_1, D_2, \ldots, D_N$ may be decoded without access to all N portions $D_1, D_2, \ldots, D_N$.

The reframing section 120 forms N bitstream frames $F_1, F_2 \ldots F_N$ carrying the respective portions $D_1, D_2, \ldots, D_N$. As N bitstream frames $F_1, F_2 \ldots F_N$ represent one decodable set of audio data D, the bitstream frames $F_1, F_2 \ldots F_N$ have a second frame rate which is N times the frame rate of the decodable set of audio data D. Similarly, although the bitstream frames $F_1, F_2 \ldots F_N$ do not themselves represent certain samples of the audio signal X, N bitstream frames $F_1, F_2 \ldots F_N$ represent the decodable set of audio data D and therefore correspond to a second number of samples per frame, where the first number of samples per frame is N times the second number of samples per frame.

The reframing section 120 outputs a bitstream B segmented into bitstream frames including the formed N bitstream frames $F_1, F_2 \ldots F_N$ as N consecutive bitstream frames.

In addition to the portions $D_1, D_2, \ldots, D_N$ of audio data, the bitstream frames $F_1, F_2 \ldots F_N$ also comprise respective metadata $\mu_1, \mu_2 \ldots, \mu_N$ indicating that the decodable set of audio data D is obtainable from the portions $D_1, D_2, \ldots, D_N$ carried by the bitstream frames $F_1, F_2 \ldots F_N$. The metadata $\mu_1, \mu_2 \ldots, \mu_N$ of each of the bitstream frames $F_1, F_2 \ldots F_N$ may for example indicate which portion of the decodable set of audio data D is carried by that bitstream frame, and, may optionally also indicate the bitstream frames carrying the other N−1 portions of the decodable set of audio data D.

Figure 3:
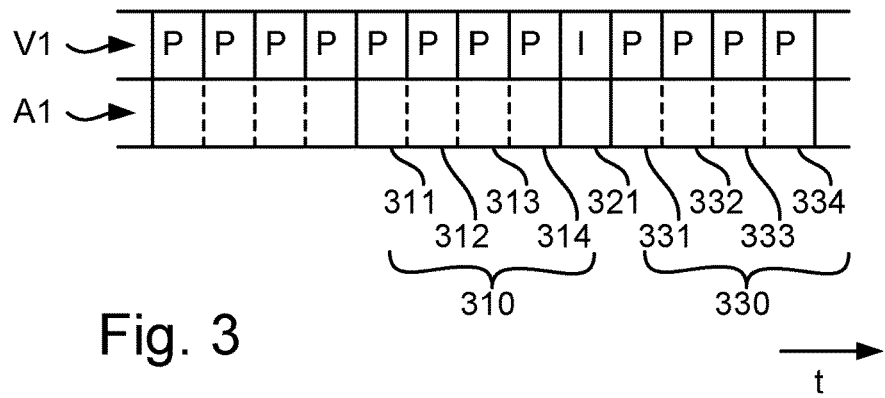
FIGS. 3 and 4 illustrate examples of audio bitstreams provided by the audio processing system depicted in FIG. 1, according to example embodiments.
Figure 4:
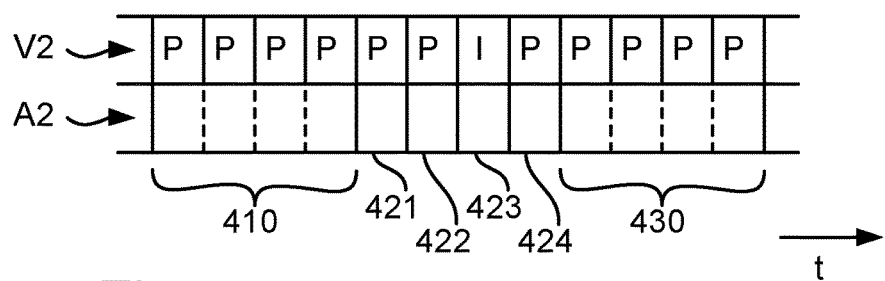

FIGS. 3 and 4 illustrate examples of bitstreams provided by the audio processing system 100, described with reference to FIG. 1, according to example embodiments.

The bitstream B output by the audio processing system 100 shown in FIG. 1 may be associated with a stream of video frames. The bitstream B is exemplified in FIG. 3 by a stream A1 of bitstream frames and a stream V1 of video frames, where the rightward direction corresponds to increasing time t.

The stream V1 of video frames includes predicted coded video frames P (including frames depending on preceding frames only and/or so-called bidirectional frames, which depend on both preceding and subsequent frames) and an independently coded video frame I. The stream A1 of bitstream frames includes bitstream frames with the same frame rate and the same duration as the video frames, for facilitating splicing and/or synchronization with other audio-visual data streams.

In the present example embodiment, N=4 and the audio processing system 100 provides bitstream frames in groups 310 of four bitstream frames 311, 312, 313, 314 carrying respective portions of a decodable set of audio data. However, if the stream V1 of video frames is to be spliced with other streams of video frames, splicing may be performed at a point adjacent to the independently coded video frame I to facilitate decoding of the video frames after splicing. To maintain audio-video synchronicity, the stream A1 of bitstream frames may be spliced at the same splicing point as the stream V1 of video frames.

To facilitate decoding of the bitstream frames after splicing with another stream of bitstream frames, the audio processing system 100 encodes a segment of the audio signal X temporally related to the independently coded video frame I as a decodable set of audio data by applying signal analysis with a shortened transform stride corresponding to the second number of samples of the audio signal X, which may for example correspond to the duration of the independently coded video I frame.

Analogously to the encoding where signal analysis with the basic stride is employed, encoding employing the signal analysis with the shortened stride may include applying a windowed transform, e.g. MDCT, with the shortened stride as transform stride, and determining parameters for parametric reconstruction of the segment of the audio signal from a downmix signal, where the parameters are determined based on signal analysis with the shortened stride. The decodable set of audio data associated with the shortened stride may comprise the downmix signal and the parameters.

The audio processing system 100 includes a bitstream frame 321 carrying the decodable set of audio data, which may be independently decoded without access to audio data carried by the other bitstream frames. In the stream A1 of bitstream frames, the bitstream frame 321 is followed by another group 330 of four bitstream frames 331, 332, 333, 334 carrying respective portions of a decodable set of audio data.

The audio processing system 100 may for example comprise an additional encoding section (not shown in FIG. 1) configured to encode segments of the audio signal X by applying signal analysis with the shortened stride. Alternatively, the encoding section 110 may be operable to employ the shortened stride, and the reframing section 120 may be operable to include the bitstream frame 321, carrying the decodable set of audio data associated with the shortened stride, in the bitstream B.

In the example described with reference to FIG. 3, presence of an independently coded video frame I at certain positions may be handled by including a bitstream frame 321, carrying a decodable set of audio data associated with the shortened transform stride, between the groups 310, 330 of four bitstream frames. However, in at least some example scenarios, the positions of the independently coded video frames I may be unknown a priori, and/or the independently coded video frames I may occur at positions which do not match positions between the groups of four bitstream frames. Such a scenario is illustrated in FIG. 4.

The bitstream B and an associated stream of video frames are exemplified in FIG. 4 by another bitstream A2 of bitstream frames and another stream V2 of video frames, where time t propagates to the right.

Similarly to the example scenario described with reference to FIG. 3, the bitstream frames are provided by the audio processing system 100 in groups 410, 430 of four bitstream frames. However, once an independently coded video frame I is detected in the stream V2 of video frames, four consecutive bitstream frames 421, 422, 423, 424 are encoded by the audio processing system 100 employing the shortened stride for each of them. Depending on the position of the independently coded video frame I in the stream V2 of video frames, the independently coded video frame I may correspond to any one of the four bitstream frames 421, 422, 423, 424 provided using the shortened transform stride. In the present scenario, an independently coded bitstream frame 423 may be provided at a position in the bitstream A2 corresponding to the independently coded video I, regardless of the position of the independently coded video frame I in the stream V2 of video frames, relative to any groups of four bitstream frames in the bitstream A2 encoded using the basic stride. In the present scenario, the bitstream frames are organized in groups of four bitstream frames, regardless of the presence of independently coded video frames I in the stream V2 of video frames.

Figure 2:
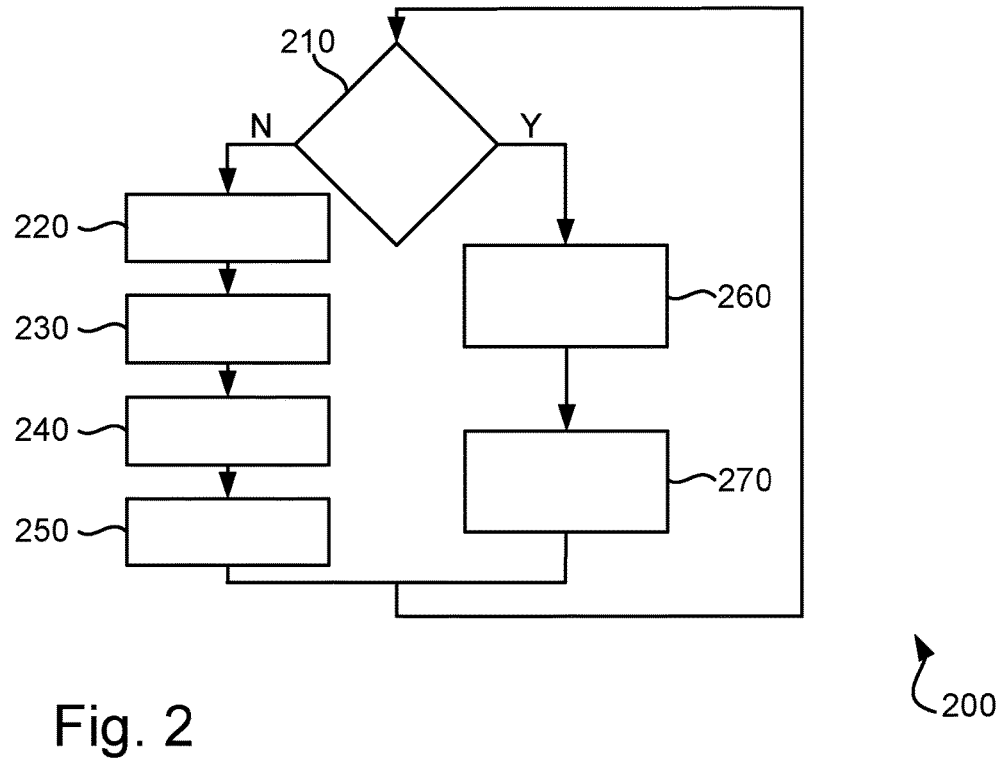
FIG. 2 is a flow chart of a method of representing an audio signal as an audio bitstream, according to an example embodiment.

FIG. 2 is flow chart of a method 200 of representing an audio signal by an audio bitstream, according to an example embodiment. The method 110 is exemplified herein by a method performed by the audio encoding system 100, described with reference to FIG. 1.

The method 200 comprises detecting 210 whether a current frame of the stream V1 of video frames is independently coded. If the current frame is not independently coded, indicated by N in the flow chart, the method 200 continues by encoding 220 a segment of the audio signal X as a decodable set of audio data D, by at least employing signal analysis with the basic stride; breaking 230 the decodable set of audio data D into N portions $D_1, D_2, \ldots, D_N$; forming 240 N bitstream frames $F_1, F_2, \ldots, F_N$ carrying the respective portions $D_1, D_2, \ldots, D_N$; and outputting 250 the formed bitstream frames $F_1, F_2, \ldots, F_N$ as part of the bitstream B. The method 200 then returns to encoding other segments of the audio signal X.

If, on the other hand, the current frame of the stream V1 of video frames is independently coded, indicated by Y in the flow chart, the method 200 instead continues by encoding 260 a segment of the audio signal X as a decodable set of audio data by at least employing signal analysis with the shortened stride; and including 270 a bitstream frame carrying the second decodable set of audio data in the bitstream B. The method 200 then returns to decoding other segments of the audio signal X.

Figure 5:
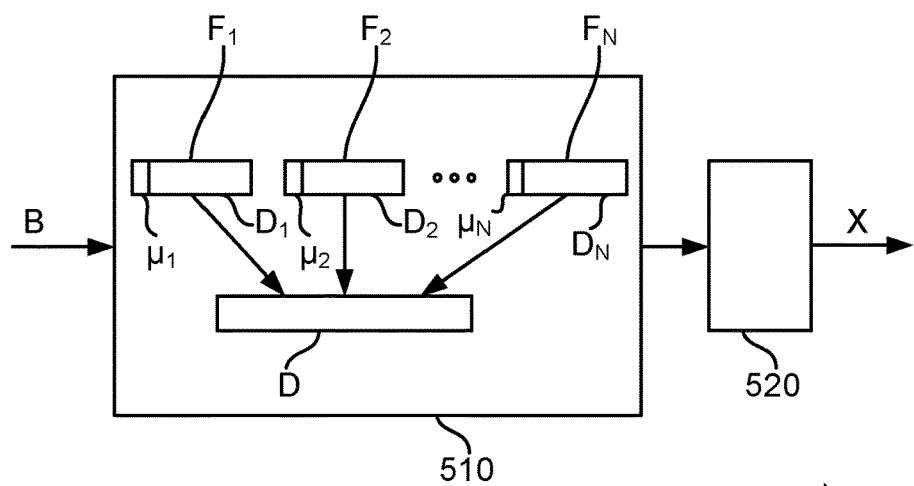
FIG. 5 is a generalized block diagram of an audio processing system for reconstructing an audio signal represented by a bitstream, according to an example embodiment.

FIG. 5 is a generalized block diagram of an audio processing system 500 for reconstructing an audio signal represented by a bitstream, according to an example embodiment.

In the present example embodiment, the bitstream is exemplified by the bitstream B output by the audio processing system 100, described with reference to FIG. 1. Example embodiments are also described below in which the audio processing system 500 receives bitstreams which have been modified e.g. by frame drops and/or frame duplications before being received by the audio processing system 500.

The audio processing system 500 comprises a buffer 510 and a decoding section 520. The buffer 510 joins sets of audio data $D_1, D_2, \ldots, D_N$ carried by N respective bitstream frames $F_1, F_2, \ldots F_N$ into one decodable set of audio data D corresponding to the first frame rate, e.g. 30 fps, and to the first number of samples of the audio signal per frame. As described with reference to FIG. 1, the bitstream frames $F_1, F_2, \ldots F_N$ have the second frame rate corresponding to the second number of samples of the audio signal per bitstream frame, where the first number of samples is N times the second number of samples. The buffer 510 employs the metadata $\mu_1, \mu_2, \ldots, \mu_N$ carried by the bitstream frames to identify the frames $F_1, F_2, \ldots F_N$ carrying the sets of audio data $D_1, D_2, \ldots, D_N$ to be joined.

The decoding section 520 decodes the decodable set of audio data D into a segment of the audio signal X by employing signal synthesis, based on the decodable set of audio data D, with the basic stride described with reference to FIG. 1, i.e. the basic stride corresponding to the first number of samples of the audio signal X. The audio processing system 500 outputs a reconstructed version $\tilde{X}$ of the audio signal X.

As described with reference to FIG. 1, the audio signal X is a multichannel audio signal, and the decodable set of audio data D comprises the downmix signal and the associated upmix parameters for parametric reconstruction of the audio signal X. The decoding section 520 performs parametric reconstruction of a frequency-domain representation of the segment of the audio signal X, employing the basic stride. The decoding section 520 then applies a windowed transform, e.g. inverse MDCT, having the basic stride as transform stride, for obtaining a time-domain representation of the segment of the audio signal X.

Embodiments may also be envisaged in which the parametric reconstruction is performed with a different stride than the windowed transform. Embodiments may for example be envisaged in which the windowed transform employs a shorter transform stride than the basic stride, and in which the parametric reconstruction is performed with the basic stride.

As described with reference to FIGS. 3 and 4, the bitstream B may comprise bitstream frames carrying decodable sets of audio data, i.e. sets of audio data which are decodable independently of each other by employing the shortened stride. The audio processing system 500 may for example comprise an additional decoding section (not shown in FIG. 5) configured to decode a decodable set of audio data employing the shortened stride. Alternatively, the decoding section 520 may be operable to decode such a decodable set of audio data using the shortened stride, and the buffer 510 may be operable to transfer such a decodable set of audio data to the decoding section 520 without joining it with audio data from other bitstream frames.

In order to allow smooth switching between segments of the audio signal X decoded using the shortened stride, and segments of the audio signal X decoded using the basic stride, the audio processing system 500 may for example provide a delay so that decoding of a group of N consecutive bitstream frames at the second frame rate, i.e. employing the shortened stride, completes at the same time as if the bitstream frames had each carried sets of audio data requiring joining into a decodable set of audio data, for decoding. The buffer 510 may for example provide such a delay by buffering decodable sets of audio data prior to transmitting them to the decoding section 520. Alternatively, the decoding section 520 may provide the delay by buffering reconstructed segments of the audio signal X, prior to providing them as output.

An audio bitstream B output by the audio processing system 100, described with reference to FIG. 1, may have been modified, e.g. by splicing with other bitstreams, or by frame drop/duplication of frames before it is received by the audio processing system 500 described with reference to FIG. 5.

As descried with reference to FIG. 3, the bitstream frames may have the same durations as the corresponding video frames in an associated stream V1 of video frames. Employing such synchronized audio streams A1 and video streams V1 in audiovisual data streams facilitates splicing and/or synchronization of the audiovisual streams.

A device or component performing the splicing may not need to take into account which types of bitstream frames are arranged after each before or after the splicing. Instead, the audio processing system 500 may be adapted to handle a situation where some of the N bitstream frames $F_1$, $F_2$, . . . , $F_N$ of a group carrying respective portions $D_1$, $D_2$, . . . , $D_N$ of a decodable set of audio data D are missing in the received bitstream B, e.g. due to splicing and/or fame drop/duplication. The audio processing system 500 may be configured to detect that bitstream frames are missing, e.g. based on the metadata $\mu_1$, $\mu_2$, . . . , $\mu_N$ carried by the respective bitstream frames $F_1$, $F_2$, . . . , $F_N$.

Once it is detected that bitstream frames required for decoding are missing, the audio processing system 500 may for example employ an error concealment strategy in order to continue decoding of the audio signal X. The concealment strategy may for example include replacing the audio data carried by bitstream frames in an incomplete group of bitstream frames, i.e. a group from which one or more bitstream frames are missing in the received bitstream, by silence (e.g. by zeros as frequency-domain coefficients for the audio signal X). Fade-out and/or fade-in may for example be employed by the audio processing system 500 in order to provide smoother transitions between decodable segments of the audio signal X, and silence replacing non-decodable segments of the audio signal X, as perceived by a listener.

In some example embodiments, the audio processing system 500 may be configured to accept bitstreams associated with at least two different predefined values for the second frame rate, but associated with a common value for the second number of samples per frame. This is exemplified in Table 1 by the values 59.940 fps and 60.000 fps for the second frame rate, and the common value 768 for the second number of samples per frame. Such frame rates may be useful for audio streams associated with video streams having these frame rates.

TABLE 1

| Video frame rate [fps] | Second frame rate [fps] | Second number of samples per frame | N | First frame rate [fps] | First number of samples per frame |
|---|---|---|---|---|---|
| 29.970 | 29.970 | 1536 | 1 | 29.970 | 1536 |
| 30.000 | 30.000 | 1536 | 1 | 30.000 | 1536 |
| 59.940 | 59.940 | 768 | 2 | 29.970 | 1536 |
| 60.000 | 60.000 | 768 | 2 | 30.000 | 1536 |
| 119.880 | 119.880 | 384 | 4 | 29.970 | 1536 |
| 120.000 | 120.000 | 384 | 4 | 30.000 | 1536 |

In the present example, the values of the second frame rate differ by less than 5%. The audio processing system 500 may be adapted to decode the audio signal X employing the same value for the basic stride for these two different values of the second frame rate. As described in the applicant's co-pending, not yet published, patent application PCT/EP2014/056848 (see in particular the part of the section "II. Example embodiments", describing FIG. 1 and Table 1 therein), a variation of the internal sampling frequency of the decoding section 520, caused by the difference in the second frame rate, may typically be so small that an acceptable playback quality of the reconstructed audio signal X, as perceived by a listener, may still be provided by the audio processing system 500. Another example in Table 1 of values of the second frame rate differing by less than 5% is given by the values 119.880 fps and 120.000 fps for the second frames rate, and the common value 384 for the second number of samples per frame.

As shown in Table 1, if the video frame rate is 60.00 fps, N=2 bitstream frames with the second frame rate 60.000 fps may be employed to represent one decodable set of audio data with the first frame rate 30.000 fps. Similarly, if the video frame rate is 59.940 fps, N=2 bitstream frames with the second frame rate 59.940 may be employed to represent one decodable set of audio data with the first frame rate 29.970 fps. Table 1 also shows that if the video frame rate is 120 fps, N=4 bitstream frames with the second frame rate 120.000 may be employed to represent one decodable set of audio data with the first frame rate 30.000 fps. Similarly, if the video frame rate is 119.880 fps, N=4 bitstream frames with the second frame rate 119.880 may be employed to represent one decodable set of audio data with the first frame rate 29.970 fps.

Figure 6:
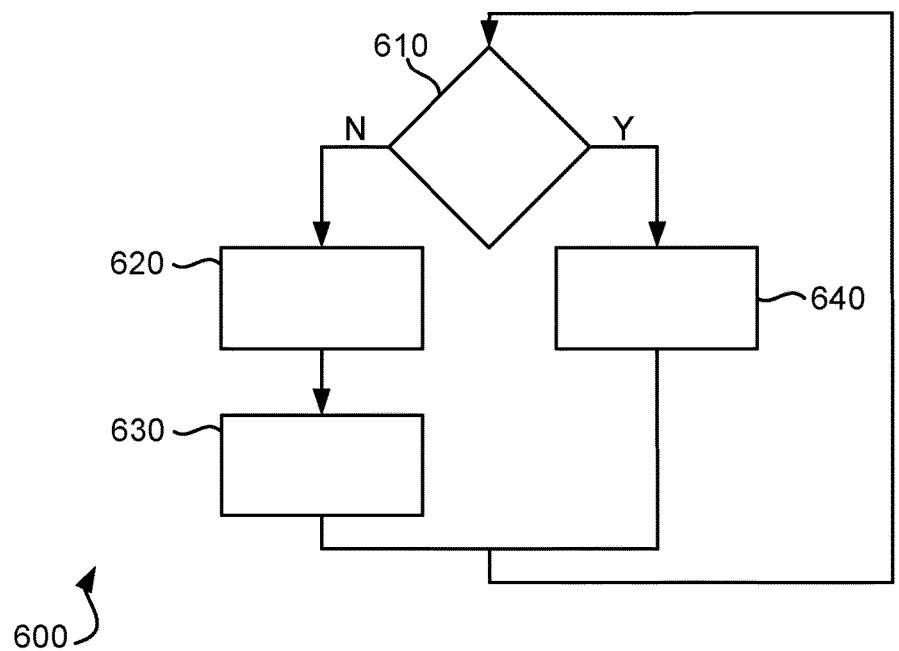
FIG. 6 is a flow chart of a method of reconstructing an audio signal represented by a bitstream, according to an example embodiment.

FIG. 6 is a flow chart of an audio processing method 600 of reconstructing an audio signal represented by a bitstream, according to an example embodiment. The method 600 is exemplified herein by a method performed by the audio processing system 500, described with reference to FIG. 5.

The method 600 comprises detecting 610 whether a received bitstream frame carries a decodable set of audio data corresponding to the second frame rate.

If no, indicated by N in the flowchart, the method 600 continues by joining 620 sets of audio data $D_1$, $D_2$, . . . , $D_N$ carried by N respective bitstream frames $F_1$, $F_2$, . . . , $F_N$ into one decodable set of audio data D corresponding to the first frame rate and to the first number of samples of the audio signal per frame; and decoding 630 the decodable set of audio data D into a segment of the audio signal X by at least employing signal synthesis, based on the decodable set of data D, with the basic stride corresponding to the first number of samples of the audio signal X. The method 600 then returns to the step of detecting 610 whether the next received bitstream frame carries a decodable set of audio data.

If yes, indicated by Y in the flow chart, the method 600 instead continues by decoding 640 the decodable set of audio data corresponding to the second frame rate into a segment of the audio data X by at least employing the shortened stride corresponding to the second number of samples of the audio signal X. The method 600 then returns to the step of detecting 610 whether the next received bitstream frame carries a decodable set of audio data.

Figure 7:
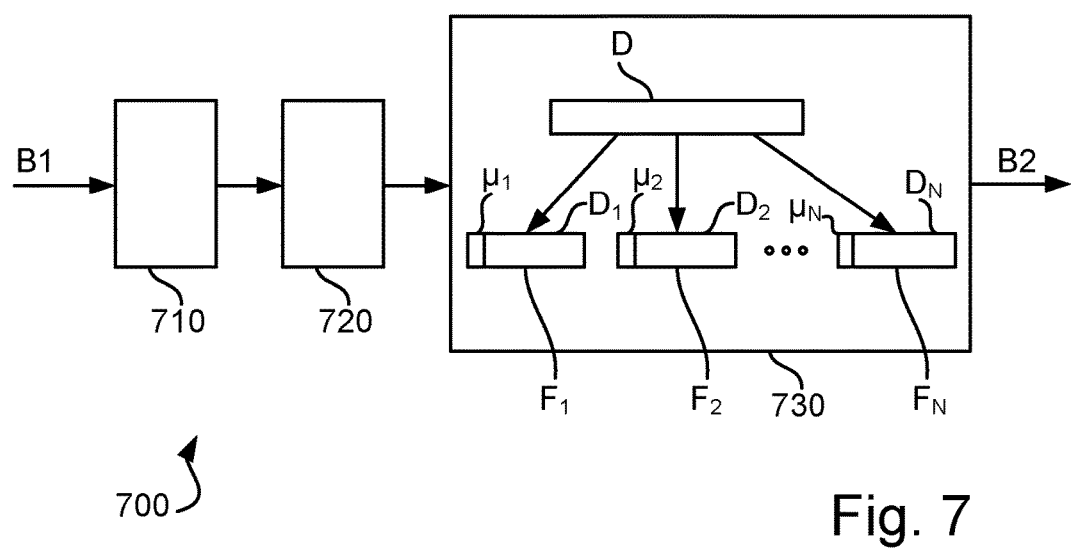
FIG. 7 is a generalized block diagram of an audio processing system for transcoding an audio bitstream representing an audio signal, according to an example embodiment.

FIG. 7 is a generalized block diagram of an audio processing system 700 for transcoding an audio bitstream representing an audio signal, according to an example embodiment.

The audio processing system 700 comprises a receiving section 710, an optional processing section 720, and a reframing section 730. The receiving section 710 receives a bitstream B1 comprising a sequence of decodable sets of audio data D corresponding to a first frame rate and to the first number of samples of the audio signal per frame, e.g. described with reference to FIG. 1. The receiving section 710 extracts a decodable set of audio data D from the bitstream B1.

The (optional) processing section 720 processes the decodable set of audio data D. Depending on the nature of the processing, this may require initially decoding the audio data into a transform or waveform representation; the processing section 720 may then perform the sequence signal synthesis, processing, signal analysis.

The reframing section 730 breaks the processed decodable set of audio data D into N portions $D_1, D_2, \ldots, D_N$, and forms N bitstream frames $F_1, F_2, \ldots, F_N$ carrying the respective portions $D_1, D_2, \ldots, D_N$. In the present example embodiment, the reframing section 730 performs the same operations as the reframing section 120 in the audio processing system 100, described with reference to FIG. 1. Hence, the bitstream frames $F_1, F_2, \ldots, F_N$ have the second frame rate corresponding to the second number of samples of the audio signal per bitstream frame, and the reframing section 730 outputs a bitstream B2 segmented into bitstream frames including the formed N bitstream frames $F_1, F_2, \ldots, F_N$.

The bitstream B2 output by the audio processing system 700 may for example coincide with the bitstream B output by the audio processing system 100, described with reference to FIG. 1. The Bitstream B1 received by the audio processing system 700 may for example be a 30 fps audio bitstream provided by an audio encoder known in the art.

It will be appreciated that the bitstream B, described with reference to FIGS. 1 and 5, and the bitstream A1 of bitstream frames, described with reference to FIG. 3, are examples of a computer-readable medium representing the audio signal X and segmented into bitstream frames, in accordance with example embodiments.

It will also be appreciated that N may be any integer larger than 1.

VI. Equivalents, Extensions, Alternatives and Miscellaneous

Even though the present disclosure describes and depicts specific example embodiments, the invention is not restricted to these specific examples. Modifications and variations to the above example embodiments can be made without departing from the scope of the invention, which is defined by the accompanying claims only.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs appearing in the claims are not to be understood as limiting their scope.

The devices and methods disclosed above may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out in a distributed fashion, by several physical components in cooperation. Certain components or all components may be implemented as software executed by a digital processor, signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

What is claimed is:

1. A method of representing an audio signal as an audio bitstream, the method comprising:

encoding a segment of the audio signal as one decodable set of audio data by at least performing signal analysis, on the segment of the audio signal, with a basic stride corresponding to a first number of samples of the audio signal, the decodable set of audio data corresponding to a first frame rate and to the first number of samples of the audio signal per frame;

breaking the decodable set of audio data into N portions, where N≥2;

forming N bitstream frames carrying the respective portions, wherein the N bitstream frames represent the decodable set of audio data and correspond to a second number of samples of the audio signal per frame, wherein the first number of samples per frame is N times the second number of samples per frame, and wherein the N bitstream frames have a second frame rate which is N times the first frame rate; and outputting a bitstream segmented into bitstream frames including the N bitstream frames previously formed, wherein the method further comprises:

in response to a stream of video frames comprising a video frame of a certain type, encoding a segment of the audio signal temporally related to said video frame as a second decodable set of audio data by at least performing signal analysis, on the segment of the audio signal temporally related to said video frame, with a shortened stride corresponding to the second number of samples of the audio signal, the second decodable set of audio data corresponding to said second frame rate and said second number of samples of the audio signal per frame; and including a bitstream frame carrying the second decodable set of audio data in the bitstream, said bitstream frame being independently decodable into a segment, or a sub-segment, of the audio signal.

2. The method of claim 1, wherein performing the signal analysis includes performing, with the basic stride, at least one in the group comprising:
spectral analysis,
energy analysis,
entropy analysis.

3. The method of claim 1, wherein encoding a segment of the audio signal includes at least one in the group comprising:
applying a windowed transform having the basic stride as transform stride;
computing a downmix signal and parameters for parametric reconstruction of the audio signal from the downmix signal, wherein the parameters are computed based on said signal analysis.

4. The method of claim 1, further comprising:
including metadata in at least one of the N bitstream frames carrying said portions, the metadata indicating that a complete decodable set of audio data is obtainable from the portions carried by the N bitstream frames.

5. The method of claim 1, comprising:
in response to the stream of video frames comprising a video frame of said type, encoding N consecutive segments of the audio signal as respective decodable sets of audio data by, for each of the N consecutive segments, at least applying signal analysis with the shortened stride, wherein said segment temporally related to said video frame is one of the N consecutive segments; and
including bitstream frames carrying the respective decodable sets of audio data associated with the N consecutive segments in the bitstream.

6. A non-transitory computer-readable storage medium comprising a sequence of instructions wherein, when performed by an audio signal processing device, the sequence of instructions causes the device to perform the method of claim 1.

7. The method of claim 1, wherein N=2 or N=4.

8. An audio processing system for representing an audio signal by an audio bitstream, wherein the audio processing system:
encodes a segment of the audio signal as one decodable set of audio data by at least performing signal analysis, on the segment of the audio signal, with a basic stride corresponding to a first number of samples of the audio signal, the decodable set of audio data corresponding to a first frame rate and to the first number of samples of the audio signal per frame;
breaks the decodable set of audio data into N portions, where N≥2;
forms N bitstream frames carrying the respective portions, wherein the N bitstream frames represent the decodable set of audio data and correspond to a second number of samples of the audio signal per frame, wherein the first number of samples per frame is N times the second number of samples per frame, and wherein the bitstream frames have a second frame rate which is N times the first frame rate; and
outputs a bitstream segmented into bitstream frames including the N bitstream frames previously formed, wherein the audio processing system further:
in response to a stream of video frames comprising a video frame of a certain type, encodes a segment of the audio signal temporally related to said video frame as a second decodable set of audio data by at least performing signal analysis, on the segment of the audio signal temporally related to said video frame, with a shortened stride corresponding to the second number of samples of the audio signal, the second decodable set of audio data corresponding to said second frame rate and said second number of samples of the audio signal per frame; and
includes a bitstream frame carrying the second decodable set of audio data in the bitstream, said bitstream frame being independently decodable into a segment, or a sub-segment, of the audio signal.

9. A method of reconstructing an audio signal represented by a bitstream segmented into bitstream frames, the method comprising:
joining sets of audio data carried by N respective bitstream frames into one decodable set of audio data corresponding to a first frame rate and to a first number of samples of the audio signal per frame, where N≥2, wherein the N bitstream frames represent the decodable set of audio data and correspond to a second number of samples of the audio signal per frame, wherein the first number of samples per frame is N times the second number of samples per frame, and wherein the bitstream frames have a second frame rate which is N times the first frame rate; and
decoding the decodable set of audio data into a segment of the audio signal by at least employing signal synthesis, based on the decodable set of data, with a basic stride corresponding to the first number of samples of the audio signal,
wherein the method further comprises:
detecting whether a bitstream frame carries a decodable set of audio data corresponding to the second frame rate; and
decoding the decodable set of audio data corresponding to the second frame rate into a segment of the audio signal by at least employing signal synthesis, based on the decodable set of audio data corresponding to the second frame rate, with a shortened stride corresponding to the second number of samples, wherein the first number of samples is N times the second number of samples.

10. The method of claim 9, wherein decoding the decodable set of audio data includes at least one in the group comprising:
applying a windowed transform having the basic stride as transform stride;
performing parametric reconstruction, with said basic stride, of the segment of the audio signal, based on a downmix signal and associated parameters obtained from the decodable set of audio data.

11. The method of claim 9, wherein said N bitstream frames, from which the sets of audio data are joined into the decodable set of audio data, are N consecutive bitstream frames.

12. The method of claim 9, further comprising:
determining, based on metadata carried by at least some of the bitstream frames in the bitstream, a group of bitstream frames from which to join incomplete sets of audio data into the decodable set of audio data.

13. The method of claim 9, wherein decoding a decodable set of audio data corresponding to the second frame rate includes providing a delay so that decoding of a group of N consecutive bitstream frames at the second frame rate completes at the same time as if the bitstream frames of said group of N bitstream frames had each carried sets of audio data requiring joining into a decodable set of audio data.

14. The method of claim 13, wherein said delay is provided by buffering at least one decodable set of audio data corresponding to the second frame rate or buffering at least one segment of the audio signal.

15. The method of claim 9, wherein the bitstream is associated with a stream of video frames having a frame rate coinciding with the second frame rate.

16. The method of claim 9, wherein decoding a segment of the audio signal based on the decodable set of audio data corresponding to the first frame rate comprises:
receiving quantized spectral coefficients corresponding to the decodable set of audio data corresponding to the first frame rate;
performing inverse quantization followed by a frequency-to-time transformation, whereby a representation of an intermediate audio signal is obtained;
performing at least one processing step in a frequency domain on the intermediate audio signal; and
changing a sampling rate of the processed audio signal into a target sampling frequency, whereby a time-domain representation of a reconstructed audio signal is obtained.

17. The method of claim 16, accepting bitstreams associated with at least two different values for the second frame rate but associated with a common value for the first number of samples per frame, the respective values of the second frame rate differing by at most 5%, wherein the frequency-to-time transformation is performed in a functional component configured to employ a windowed transform having a common predefined value for the basic stride as transform stride for said at least two different values for the second frame rate.

18. A non-transitory computer-readable storage medium comprising a sequence of instructions wherein, when performed by an audio signal processing device, the sequence of instructions causes the device to perform the method of claim 9.

19. The method of claim 9, wherein N=2 or N=4.

20. An audio processing system for reconstructing an audio signal represented by a bitstream segmented into bitstream frames, wherein the audio processing system:
joins sets of audio data carried by N respective bitstream frames into one decodable set of audio data corresponding to a first frame rate and to a first number of samples of the audio signal per frame, where N≥2, wherein the N bitstream frames represent the decodable set of audio data and correspond to a second number of samples of the audio signal per frame, wherein the first number of samples per frame is N times the second number of samples per frame, and wherein the bitstream frames have a second frame rate which is N times the first frame rate; and
decodes the decodable set of audio data into a segment of the audio signal by at least employing signal synthesis, based on the decodable set of audio data, with a basic stride corresponding to the first number of samples of the audio signal,
wherein the audio processing system further detects whether a bitstream frame carries a decodable set of audio data corresponding to the second frame rate, and decodes the decodable set of audio data corresponding to the second frame rate into a segment of the audio signal by at least employing signal synthesis, based on the decodable set of audio data corresponding to the second frame rate, with a shortened stride corresponding to the second number of samples, wherein the first number of samples is N times the second number of samples.

* * * * *